Jan. 28, 1930.                J. J. FRANK                 1,745,159
                     ALTERNATING CURRENT TRANSFORMER
                          Filed March 12, 1928
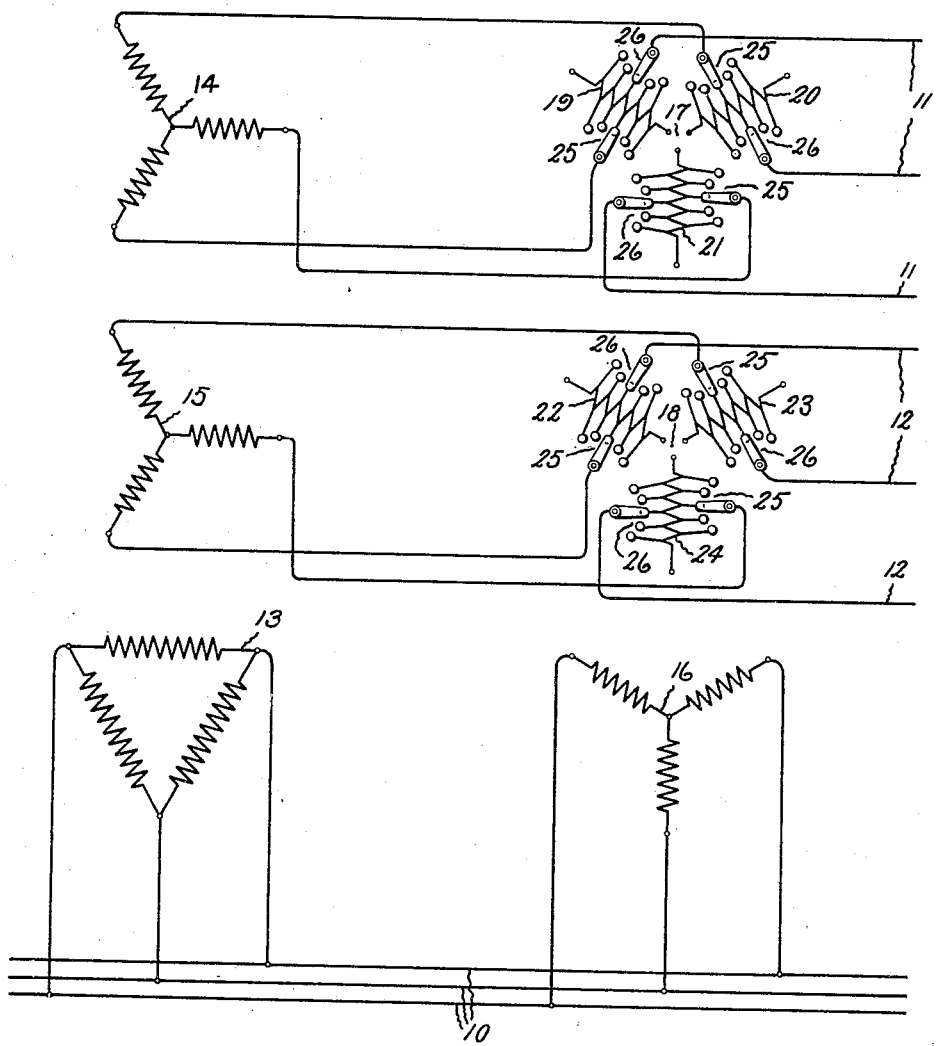
Inventor:
John J. Frank
by Charles E. Tullar
His Attorney.

Patented Jan. 28, 1930

1,745,159

UNITED STATES PATENT OFFICE

JOHN J. FRANK, OF PITTSFIELD, MASSACHUSETTS, ASSIGNOR TO GENERAL ELECTRIC COMPANY, A CORPORATION OF NEW YORK

ALTERNATING-CURRENT TRANSFORMER

Application filed March 12, 1928. Serial No. 260,857.

My invention relates to alternating current transformers and more particularly to an improved arrangement for adjusting and controlling the phase angles of the voltages and currents in circuits to which such transformers are connected.

In the operation of a large electric power system, power is frequently transmitted from one point to another of the system over parallel circuits of unequal reactances and resistances. This difference in the electrical characteristics of the circuits may be because they are of unequal lengths, because they include different proportions of cable and overhead lines, or because they include transformers or other apparatus having different reactances. The relative amounts of power transmitted by two such circuits may be such that one of them may carry less than its proper proportion so that the total amount of power which can be transmitted is limited by the carrying capacity of the other circuit.

There is a similar condition where two power systems are interconnected so that power flows from one system to the other over parallel circuits which have different reactances and resistances. In this latter case, the total amount of power transmitted through the parallel connecting circuits depends on the setting of the governors of the prime movers which respectively supply power to the two systems. The relative amounts of power transmitted over the connecting circuits, however, depend on the relative reactances and resistances of the circuits and in order to make the circuits carry their proper relative amounts of power it is necessary to adjust properly the phase angle or the voltage or both of one or more of them with respect to the others. This has been commonly done by means of induction voltage regulators.

The general object of the present invention is to provide an improved arrangement for adjusting and controlling the phase angles of the voltages and currents in circuits connected to transformer windings.

The invention will be better understood from the following description taken in connection with the accompanying drawing which shows diagrammatically one arrangement of three phase transformer windings connected to outside circuits in accordance with the invention.

In the arrangement shown in the drawing, a three phase circuit 10 supplies power to or receives power from two other three phase circuits 11 and 12. A delta connected winding 13 is connected to the circuit 10 and is indicated as being inductively related to two star connected windings 14 and 15. A star connected winding 16 is also connected to the circuit 10 and is indicated as being inductively related to two sets or groups of windings 17 and 18. The group 17 includes three separate and unconnected auxiliary windings 19, 20 and 21 with their voltages respectively at right angles to the voltages in the three phases of the winding 14. The group 18 includes three separate and unconnected auxiliary windings 22, 23 and 24 with their voltages respectively at right angles to the voltages in the three phases of the winding 15. The directions or positions of the various windings shown in the drawing indicate the phase angle relations of the voltages in these windings.

Each of the windings 19, 20 and 21 is provided with two sets of taps distributed along the winding and connected respectively to two tap switches 25 and 26. The movable contacts of the three switches 26 are connected to the three conductors of the outside circuit 11. The movable contact of each of the switches 25 is connected to that phase of the winding 14 in which the voltage is at a right angle to the voltage in the tapped winding to which the switch is connected. The positions of the tap switches 25 and 26 determine the number of turns of the tapped windings which are connected in series with their respective phases of the winding 14. Thus, a voltage may be obtained in series with and at right angles to the voltage of each of the phases of the winding 14. It will be apparent that this voltage in the tapped windings may be adjusted in value and reversed in direction by suitable adjustments of the switches. The obvious effect of varying the voltages in the tapped windings 19, 20 and 21 is to vary the phase angles of the voltages and currents in the conductors of the circuit 11. This phase adjustment will have only slight effect on the value of the voltage impressed on the outside circuit 11 and if such voltage adjustment is also desired it may be secured by any other well known means.

The windings 22, 23 and 24 are provided with taps and with tap switches 25 and 26 and are connected between the phases of the winding 15 and the conductors of the outside circuit 12 just as has been described in connection with the windings 19, 20 and 21, the winding 14 and the outside circuit 11. Thus, the phase angles of the voltages and currents in the conductors of the circuit 12 may be varied and adjusted as desired. In case the two circuits 11 and 12 are connected in parallel, a proper distribution of current between the two circuits may be secured by properly adjusting the phase angles of the currents in the two circuits relatively to each other.

The invention has been explained by describing and illustrating one of its preferred embodiments and various changes will be apparent without departing from the scope of the invention as defined in the appended claims.

What I claim as new and desire to secure by Letters Patent of the United States, is,—

1. The combination with a main transformer winding, of an auxiliary winding, means for inducing in said auxiliary winding a voltage substantially at a right angle to the voltage in said main winding, and means for connecting said auxiliary winding between said main winding and an outside circuit, said connecting means including tap connections from said auxiliary winding to vary the ratio between the voltages in said two windings, whereby the phase angle of the terminal voltage may be varied.

2. The combination with a main transformer winding, of an auxiliary winding provided with taps, means for inducing in said auxiliary winding a voltage substantially at a right angle to the voltage in said main winding, a connection between said main and auxiliary windings, and a connection between said auxiliary winding and an outside circuit, each of said connections to the auxiliary winding including a tap switch to vary the ratio between the voltages in said two windings, whereby the phase angle of the terminal voltage may be varied.

3. The combination with a main three phase winding, of three auxiliary windings, means for inducing in said auxiliary windings voltages which are respectively substantially at right angles to the voltages of the three phases of said main winding, a connection between each phase of said main winding and the auxiliary winding in which the voltage is at a right angle to its own, and a connection between each auxiliary winding and an outside three phase circuit, one of the connections to each auxiliary winding including means for varying the ratio between the voltages in the main and auxiliary windings, whereby the phase angle of the three phase terminal voltage may be varied.

In witness whereof, I have hereunto set my hand this 9th day of March, 1928.

JOHN J. FRANK.